US012051871B2

(12) United States Patent
Chen

(10) Patent No.: US 12,051,871 B2
(45) Date of Patent: Jul. 30, 2024

(54) ELECTRICAL CONNECTOR CONTACT HAVING INNER AND OUTER CONTACTING ARMS AND A SOLDERING PORTION BESIDE THE CONTACTING ARMS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 216 days.

(21) Appl. No.: 17/572,809

(22) Filed: Jan. 11, 2022

(65) Prior Publication Data

US 2022/0239028 A1 Jul. 28, 2022

(30) Foreign Application Priority Data

Jan. 26, 2021 (CN) ......................... 202120205957.5

(51) Int. Cl.
*H01R 13/24* (2006.01)
*H01R 13/405* (2006.01)

(52) U.S. Cl.
CPC ........... *H01R 13/24* (2013.01); *H01R 13/405* (2013.01)

(58) Field of Classification Search
CPC ...... H01R 9/096; H01R 23/725; H01R 13/24; H01R 13/405
USPC ............................................................ 439/74
See application file for complete search history.

(56) References Cited

U.S. PATENT DOCUMENTS 5,551,883 A * 9/1996 Davis ..................... H01R 24/62 439/83
6,409,523 B1 * 6/2002 Shih ....................... H01R 12/57 439/83
7,261,601 B1 8/2007 Chen
7,575,441 B1 * 8/2009 Huang ................. H01R 12/716 439/74
7,677,903 B1 * 3/2010 Huang ................. H01R 12/716 439/74
7,766,666 B1 * 8/2010 Chen .................... H01R 12/716 439/74
8,109,771 B2 * 2/2012 Chen ...................... H01R 13/41 439/74
8,272,881 B2 * 9/2012 Miyazaki ............. H01R 12/716 439/74
8,465,298 B2 * 6/2013 Takeuchi ........... H01R 13/6275 439/74
8,562,379 B2 * 10/2013 Miyazaki ............. H01R 13/115 439/74

(Continued)

FOREIGN PATENT DOCUMENTS

CN 110444932 A 11/2019

*Primary Examiner* — Gary F Paumen
(74) *Attorney, Agent, or Firm* — Ming Chieh Chang

(57) ABSTRACT

An electrical connector includes an insulative housing defining a channel and plural contacts secured to the insulative housing, each contact having a first arm exposed to the channel, a second arm exposed to the channel, a bottom arm connected to the first and second arms, and a soldering portion connected to the bottom arm.

8 Claims, 17 Drawing Sheets

(56) References Cited

U.S. PATENT DOCUMENTS

| | | | | |
|---|---|---|---|---|
| 8,858,239 | B2 * | 10/2014 | Little | H01R 13/631<br>439/74 |
| 2010/0291776 | A1 * | 11/2010 | Huang | H01R 13/2457<br>439/74 |
| 2013/0143421 | A1 * | 6/2013 | Tsai | H01R 24/62<br>439/83 |
| 2014/0370749 | A1 * | 12/2014 | Kato | H01R 12/73<br>439/607.31 |

* cited by examiner

ELECTRICAL CONNECTOR CONTACT HAVING INNER AND OUTER CONTACTING ARMS AND A SOLDERING PORTION BESIDE THE CONTACTING ARMS

BACKGROUND OF THE INVENTION

1. Field of the Invention

The present invention relates to an electrical connector comprising: an insulative housing defining a channel; and a plurality of contacts secured to the insulative housing and each having a first arm exposed to the channel, a second arm exposed to the channel, a bottom arm connected to the first and second arms, and a soldering portion.

2. Description of Related Arts

China Patent No. 110444932 discloses a shielded board-to-board electrical connector assembly comprising a receptacle connector having: an insulative housing defining a channel; and a plurality of contacts secured to the insulative housing and each having a first inner arm exposed to the channel, a second outer arm exposed to the channel, a bottom arm connected to the inner and outer arms, and a soldering portion connected to the outer arm through a third upstanding arm.

SUMMARY OF THE INVENTION

An electrical connector comprises an insulative housing defining a channel and a plurality of contacts secured to the insulative housing, each contact having a first arm exposed to the channel, a second arm exposed to the channel, a bottom arm connected to the first and second arms, and a soldering portion connected to the bottom arm.

DETAILED DESCRIPTION OF THE PREFERRED EMBODIMENT

Figure 1:
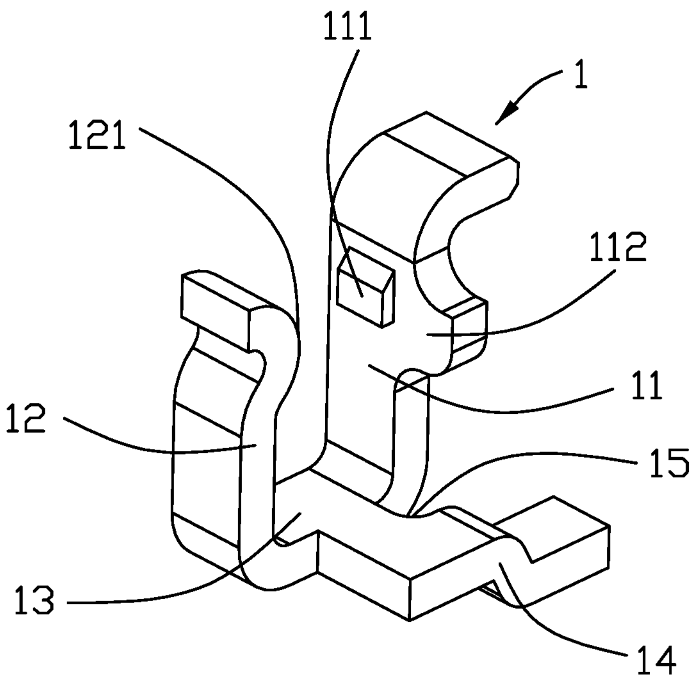
FIG. 1 is a perspective view of a contact for an electrical connector in accordance with the present invention.
Figure 2:
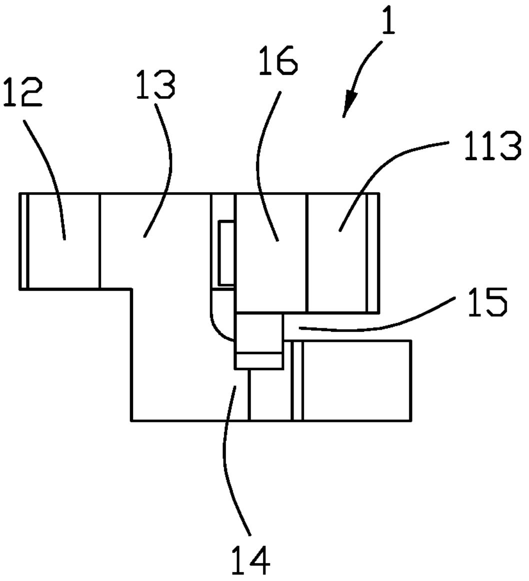
FIG. 2 is a top view of the contact.
Figure 3:
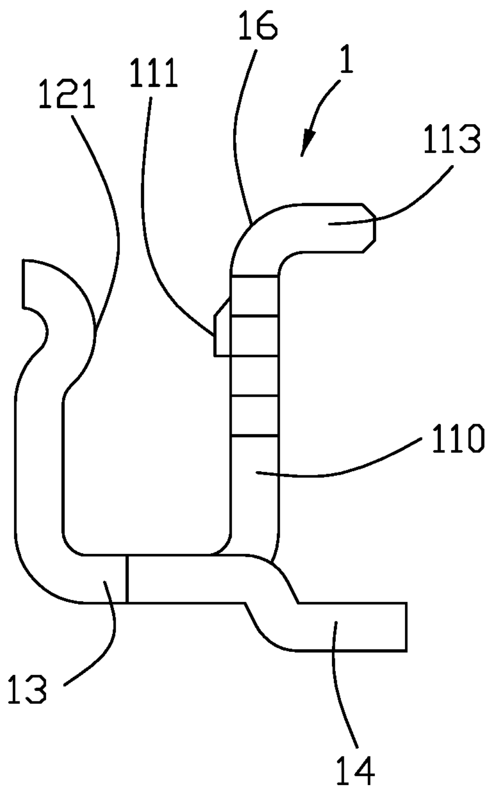
FIG. 3 is a side view of the contact.

Referring to FIGS. 1-10, an electrical connector 100 comprises an insulative housing 2 defining a channel 23 and a plurality of contacts 1 secured to the insulative housing 2 and arranged along a row direction. Each contact 1 has a first arm 11 exposed to the channel 23, a second arm 12 exposed to the channel 23, a bottom arm 13 connected to the first and second arms 11 and 12, and a soldering portion 14 connected to the bottom arm 13. The first arm 11, the second arm 12, and the bottom arm 13 form a substantially U-shaped structure. The first arm 11 has a contacting portion 111 and the second arm 12 has a contacting portion 121, the two contacting portions facing each other along a first direction. In the embodiment shown, the first arm 11 is a stationary inner arm and the second arm 12 is a flexible outer arm. The bottom arm 13 has two opposite sides along a second direction, i.e., the row direction, perpendicular to the first direction. The soldering portion 14 extends outwardly in the first direction from one side of the bottom arm 13. A gap 15 is formed in the second direction between the soldering portion 14 and the bottom arm 13. Arrangement of the soldering portion 14 at a side of the bottom arm 13 reduces a dimension of the contact 1 in the first direction.

Figure 4:
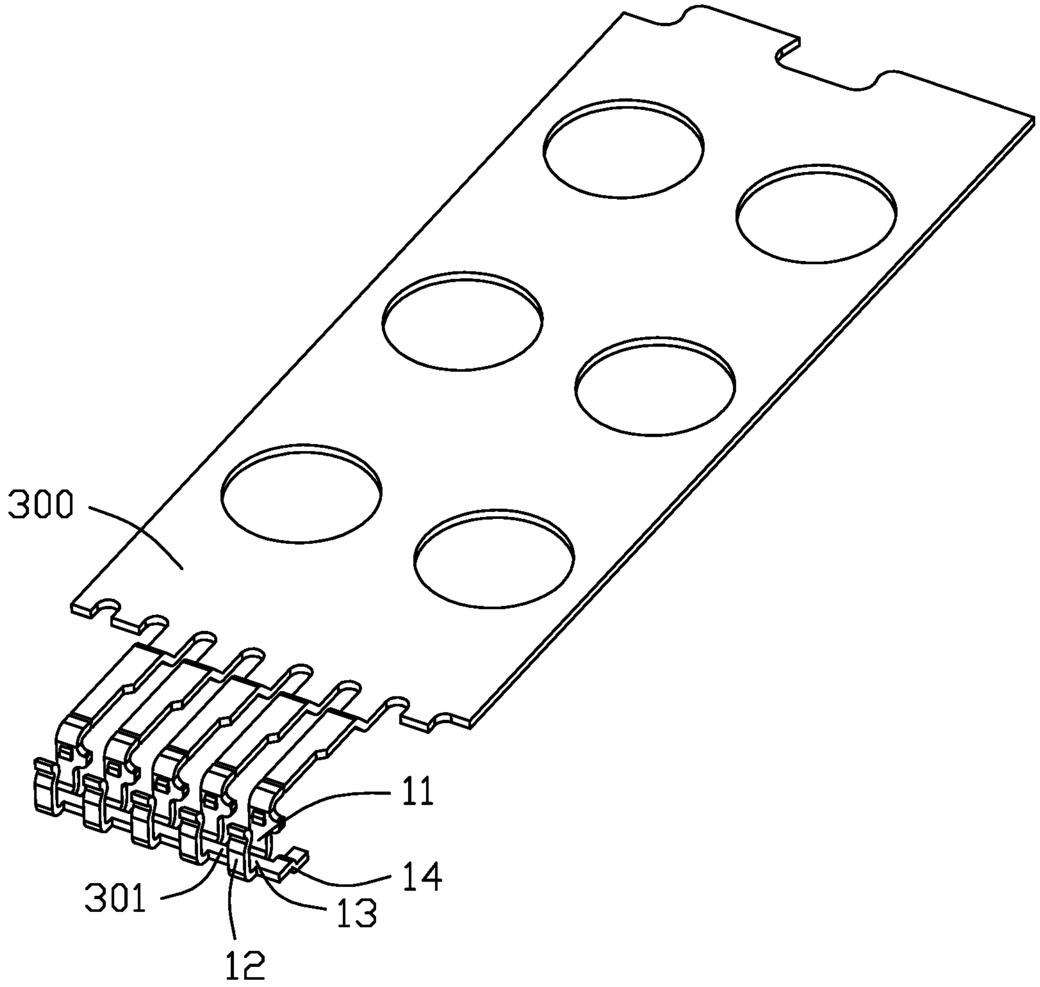
FIG. 4 shows a state of plural contacts and associated contact carrier strip during manufacturing.
Figure 5:
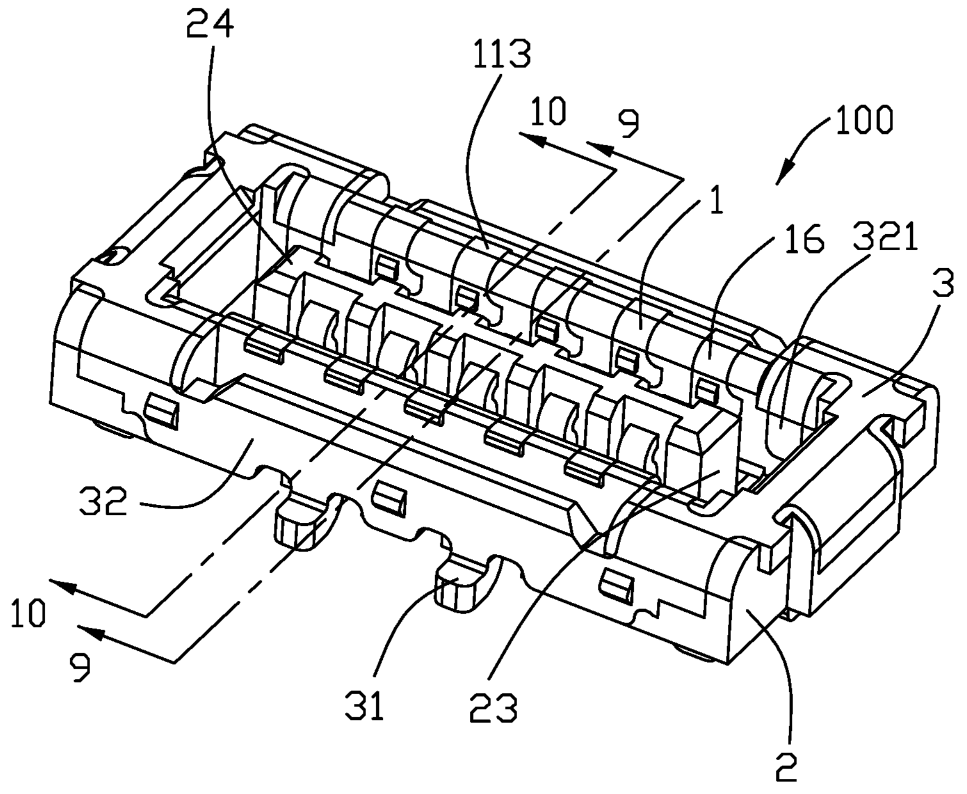
FIG. 5 is a perspective view of an electrical connector in accordance with the present invention.
Figure 6:
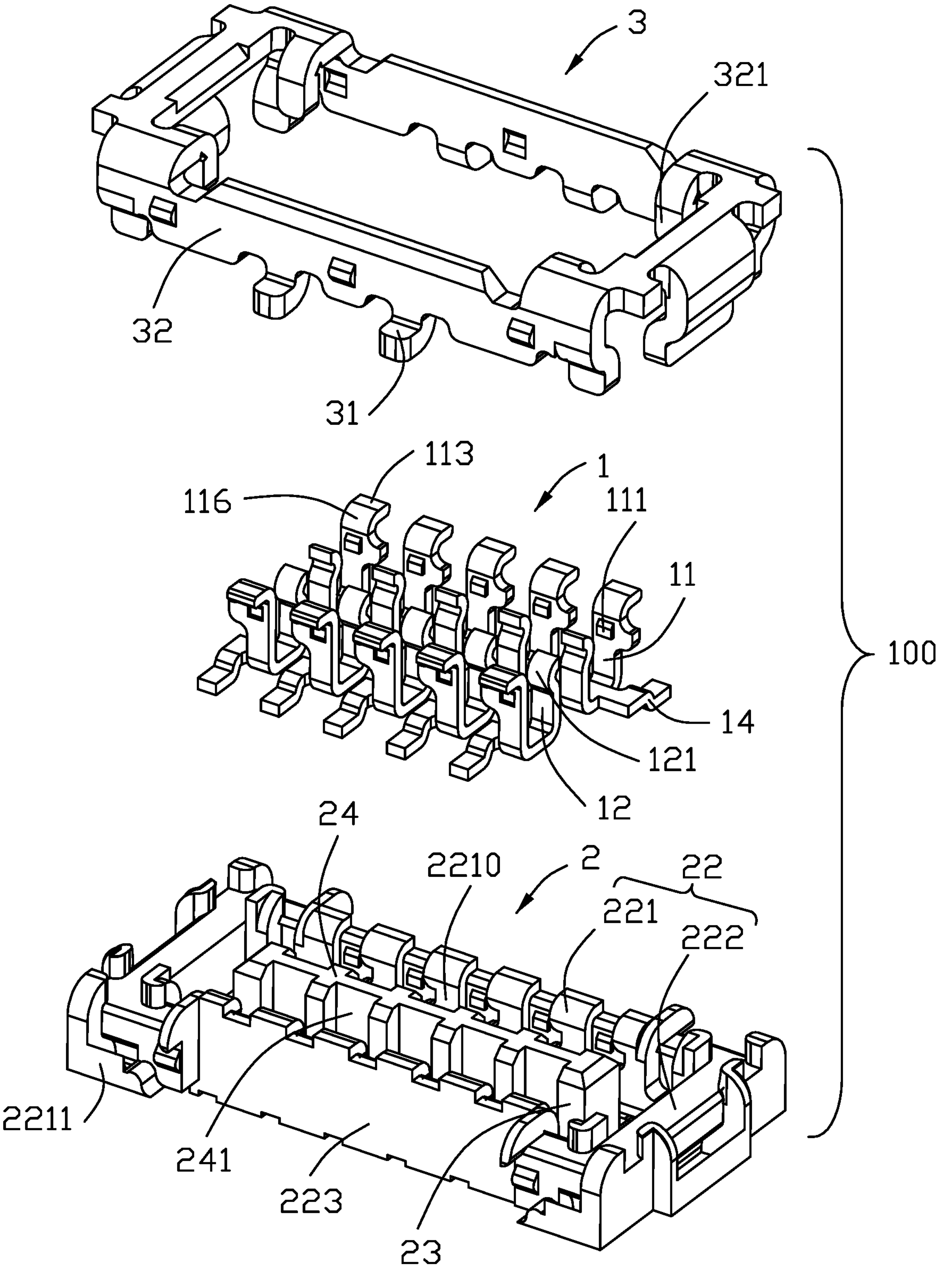
FIG. 6 is an exploded view of the electrical connector.
Figure 7:
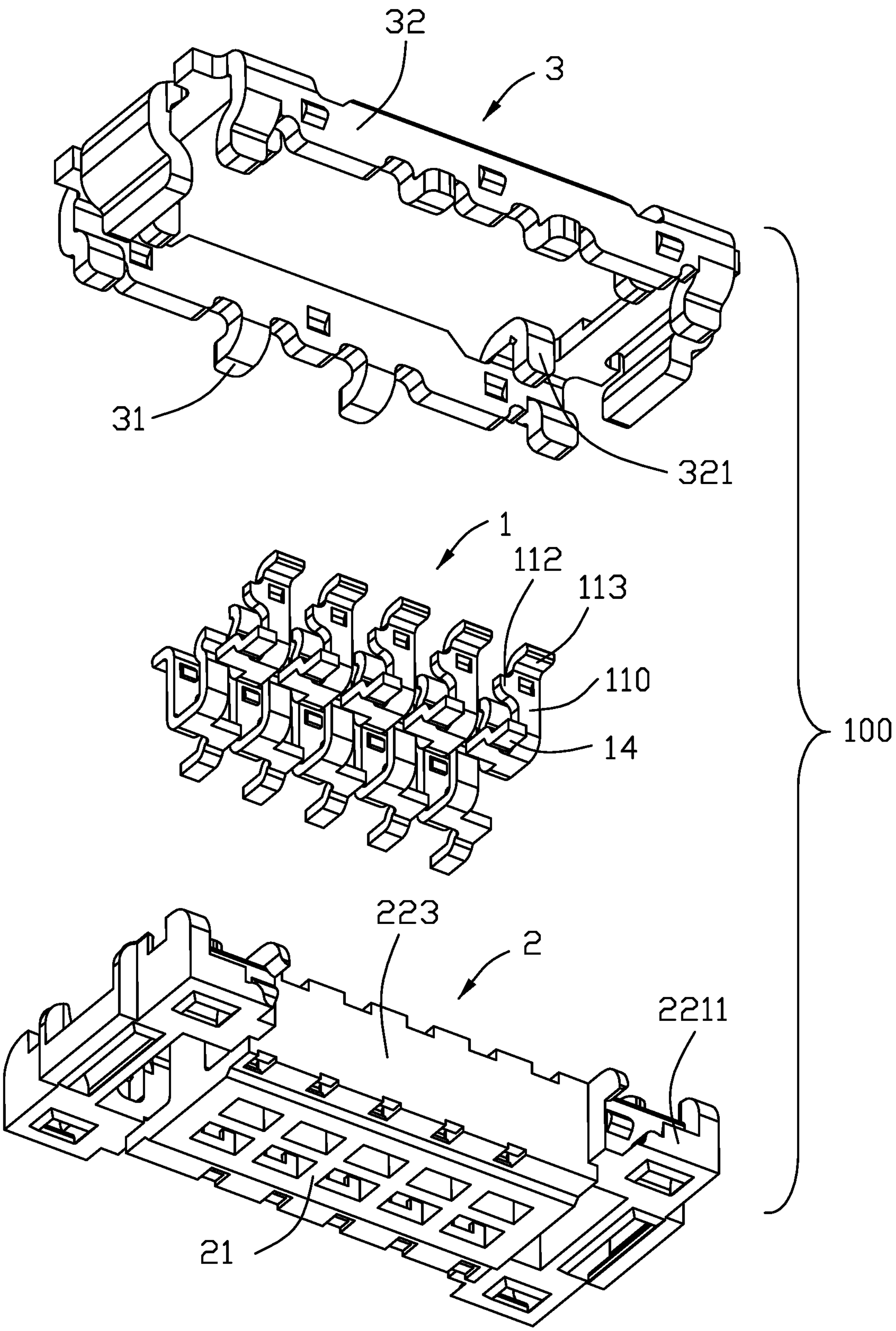
FIG. 7 is a view similar to FIG. 6 but from another perspective.

The first arm 11 has a body 110, an upper portion 113, a curved junction 16 between the body 110 and the upper portion 113, and a rib 112 protruding from the body 110. As shown in FIG. 4, a metallic carrier strip 300 is connected with plural contacts 1 and respective bridges 301 to be severed later are interconnected between every two adjacent contacts 1.

Figure 11:
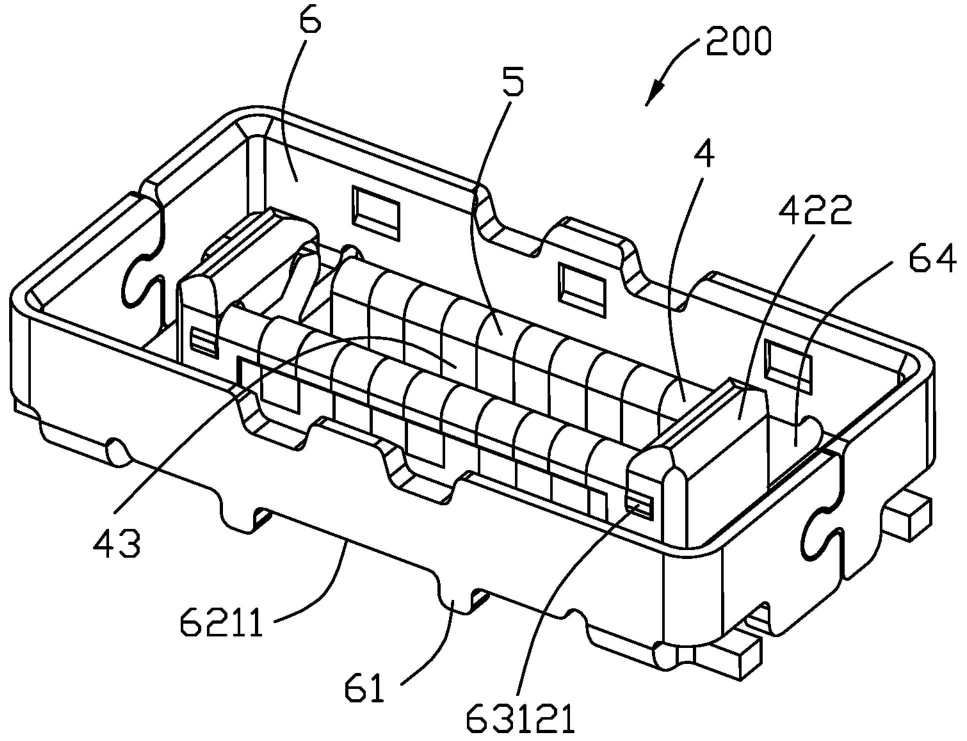
FIG. 11 is a perspective view of a mating electrical connector.
Figure 12:
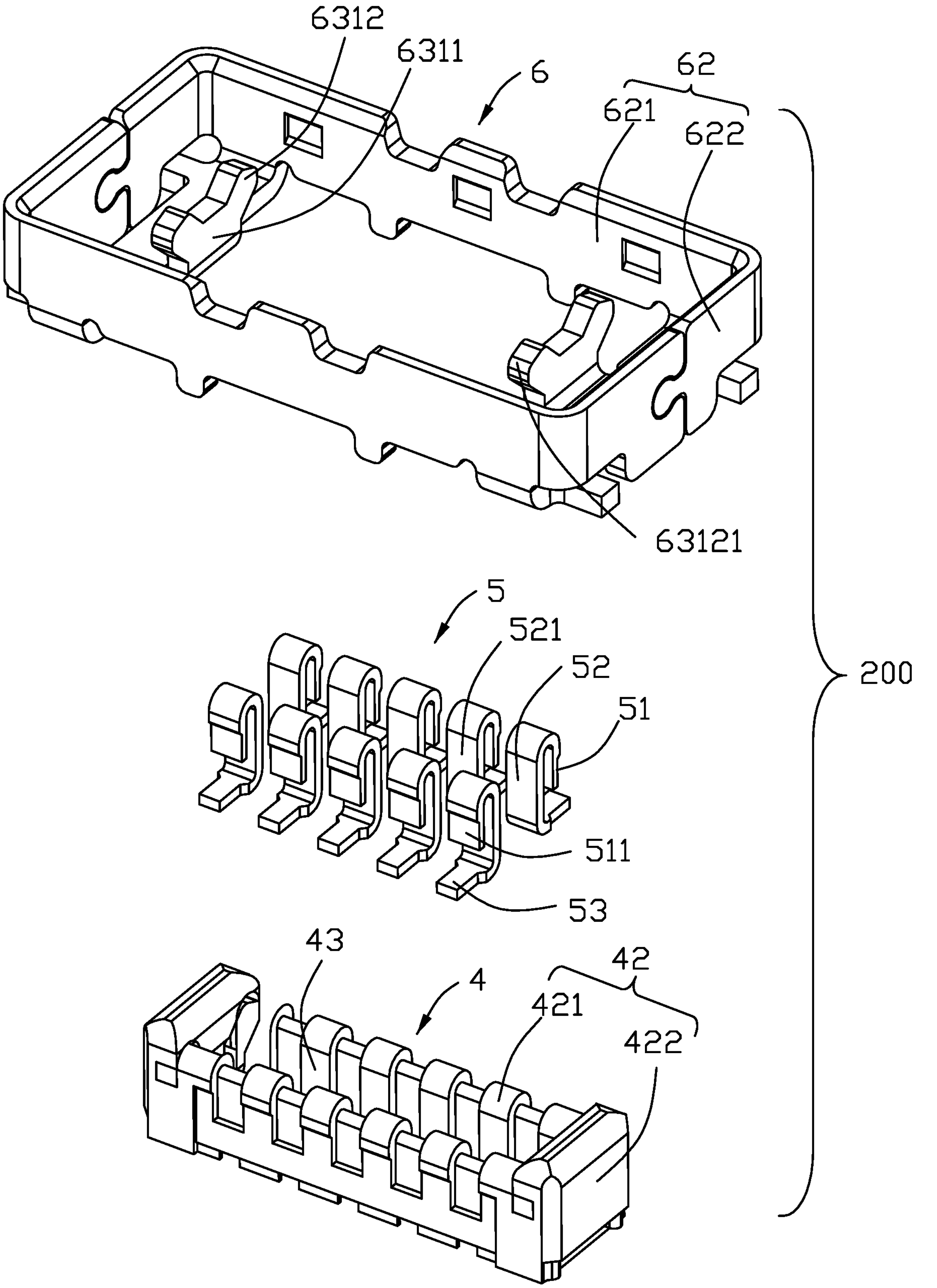
FIG. 12 is an exploded view of the mating electrical connector.
Figure 13:
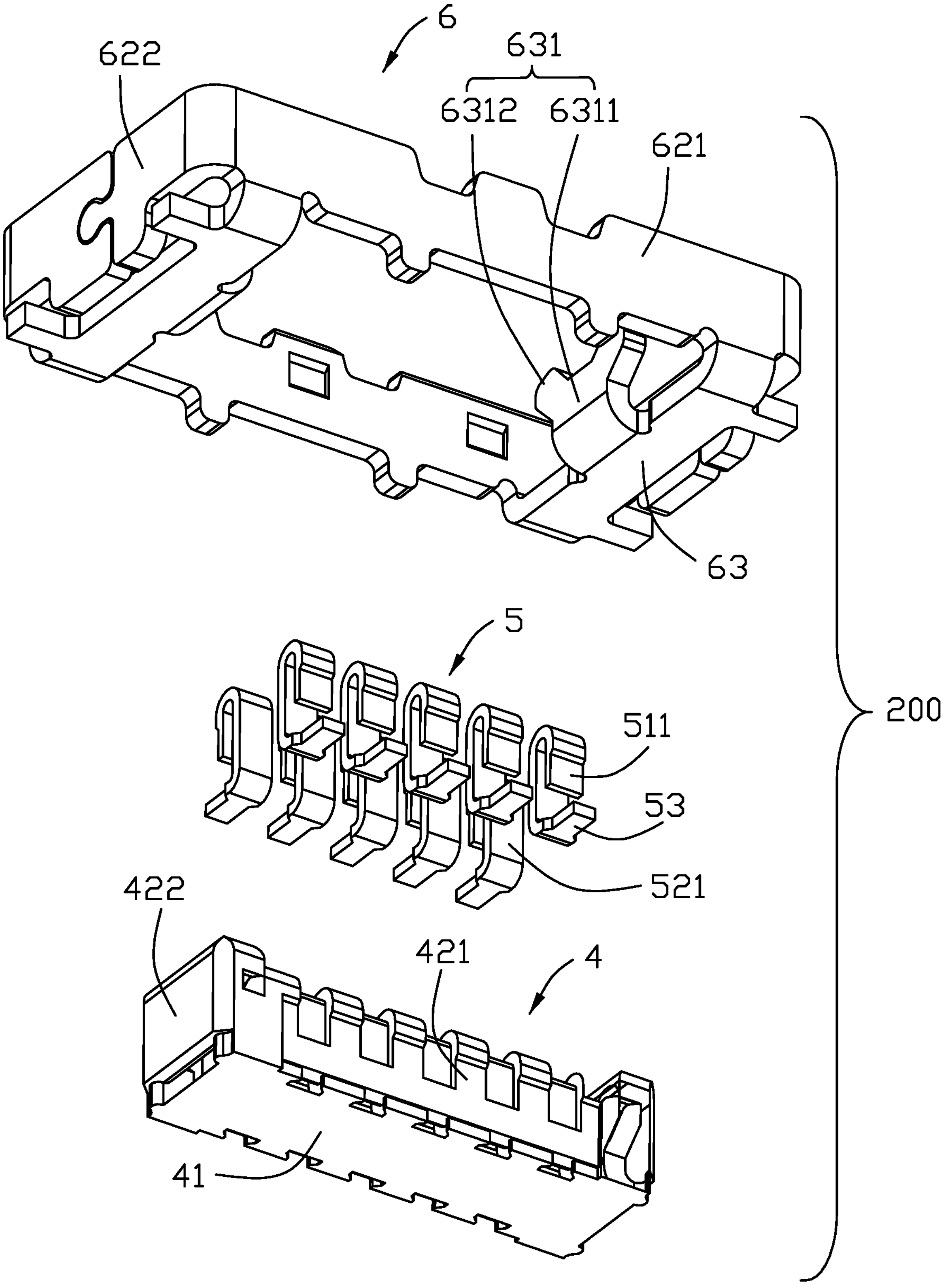
FIG. 13 is a view similar to FIG. 12 but from another perspective.
Figure 14:
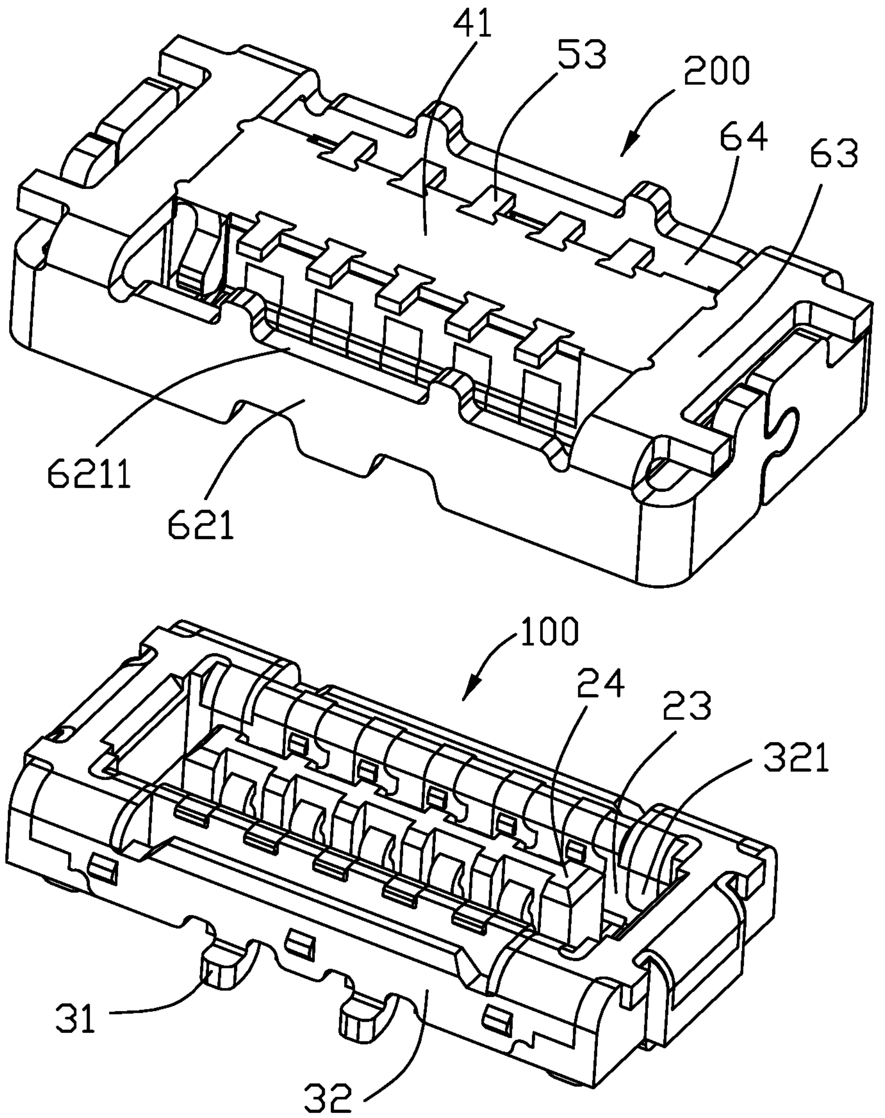
FIG. 14 is a perspective view of the electrical connector and the mating electrical connector before mating.
Figure 15:
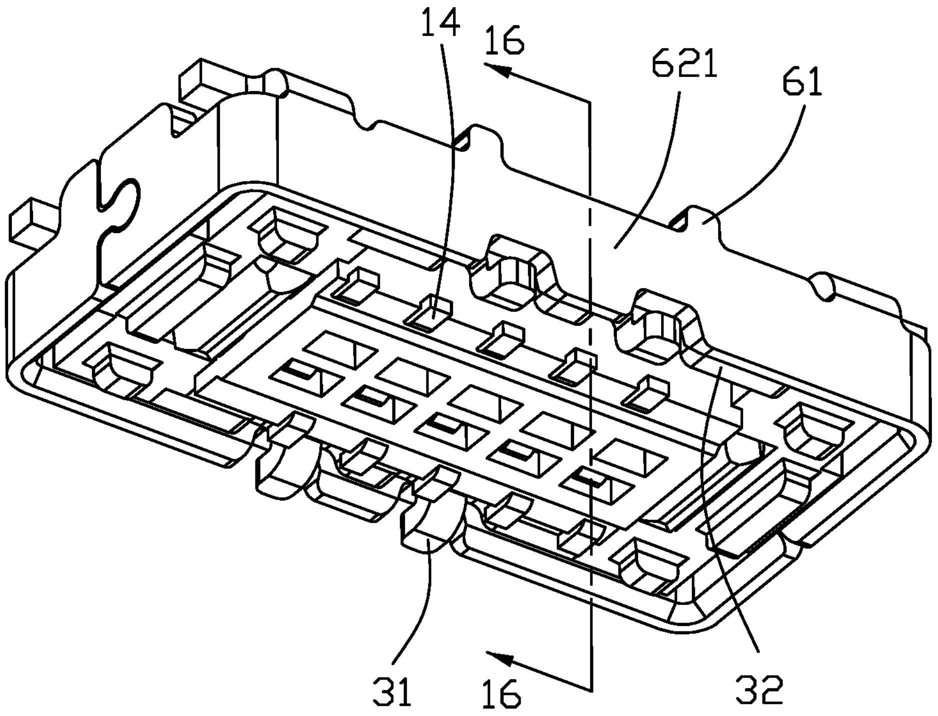
FIG. 15 is a perspective view of a mated assembly of the electrical connector and the mating electrical connector.
Figure 16:
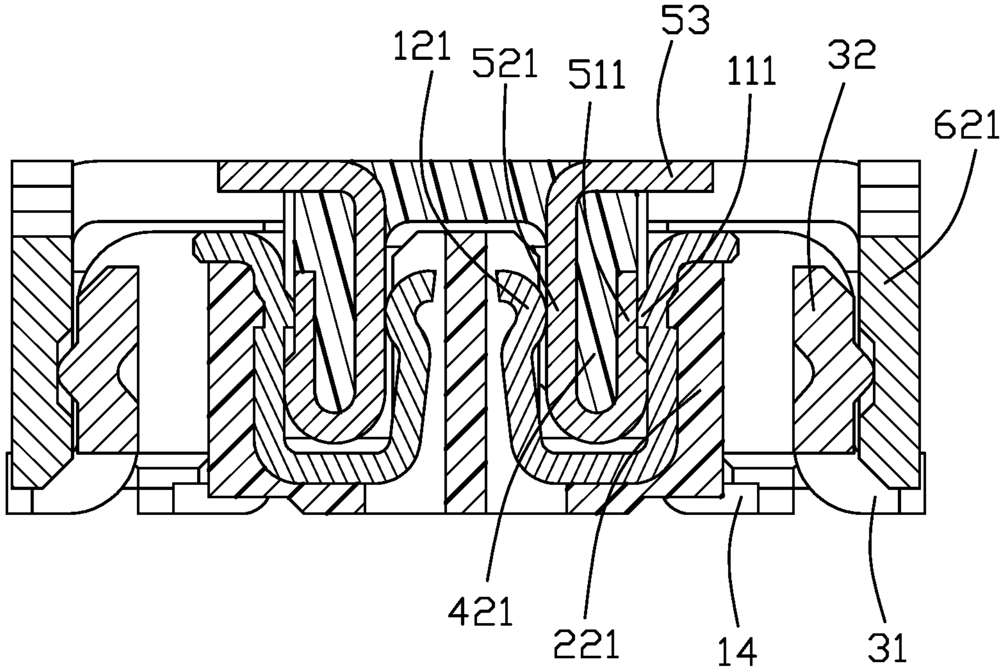
FIG. 16 is a cross-sectional view of the electrical connector assembly taken along line C-C in FIG. 15.
Figure 17:
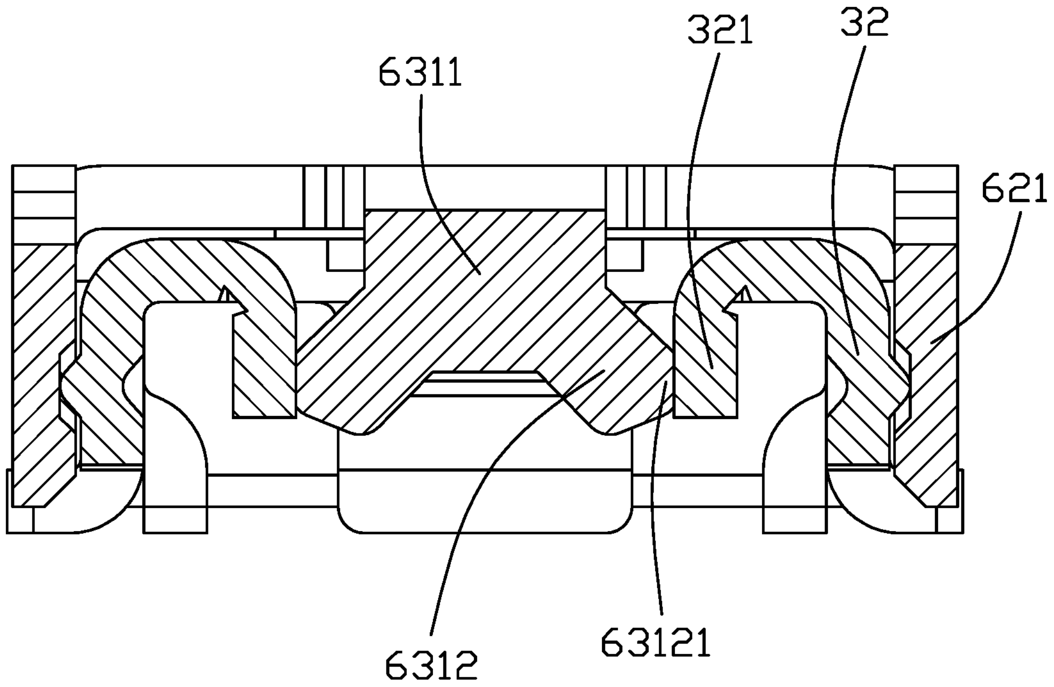
FIG. 17 is a cross-sectional view showing engagement of respective metallic shells of the electrical connector and the mating electrical connector.

The electrical connector 100 is to be mated with a complementary connector 200 specifically shown in FIGS. 11-13. In this embodiment the insulative housing 2 of the electrical connector 100 is insert-molded with the contacts 1. The electrical connector 100 may further include a metallic shell 3.

The insulative housing 2 has a base 21 and a peripheral wall 22, together defining the channel 23, and an island 24. The peripheral wall 22 includes a pair of side walls 221 and a pair of end walls 222. The first arm 11 of the contact 1 is secured to the side wall 221. Specifically, the first arm 11 is disposed at an inner face 2210 of the side wall 222 to expose the contacting portion 111 to the channel 23. The bottom arm 13 is secured to the base 21. The contacting portion 121 of the second arm 12 is also exposes to the channel 23. The soldering portion 14 extends outwardly of the side wall 221. Two rows of contacts 1 are secured to the pair of side walls 221, respectively; the island 24 has two rows of grooves 241 receiving the second arms 12 of the two rows of contacts 1, respectively. In this embodiment, the first arm 11, the bottom arm 13, and the soldering portion 14 are insert-molded to be stationary while the second arm 12 is flexible to move toward or away from the first arm 11 along the first direction. The curved junction 16 of the first arm 11 may guide the complementary connector 200 during mating.

Figure 8:
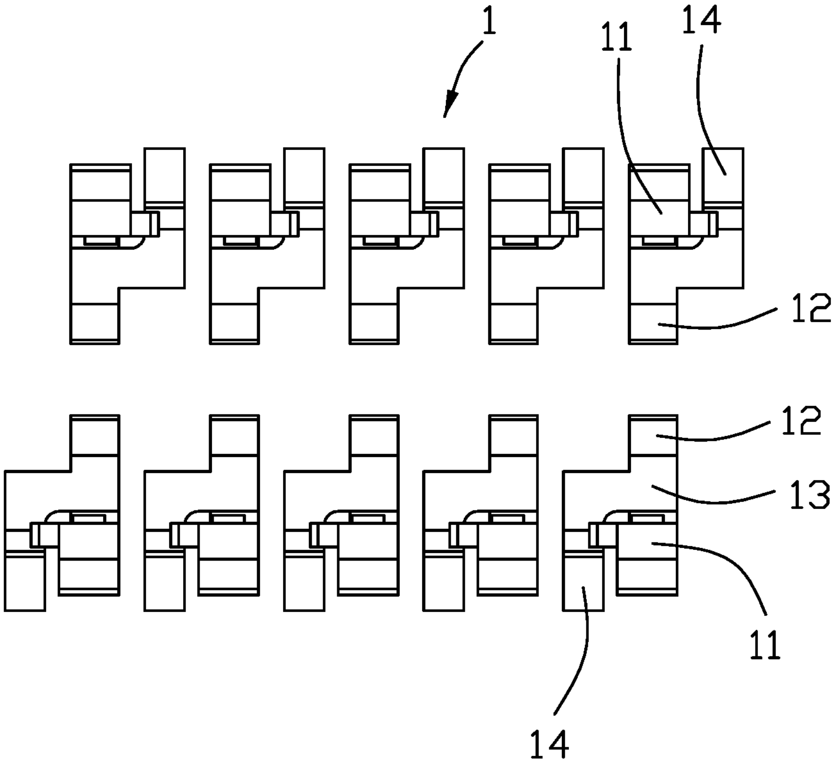
FIG. 8 is a top view showing arrangement of the contacts.
Figure 9:
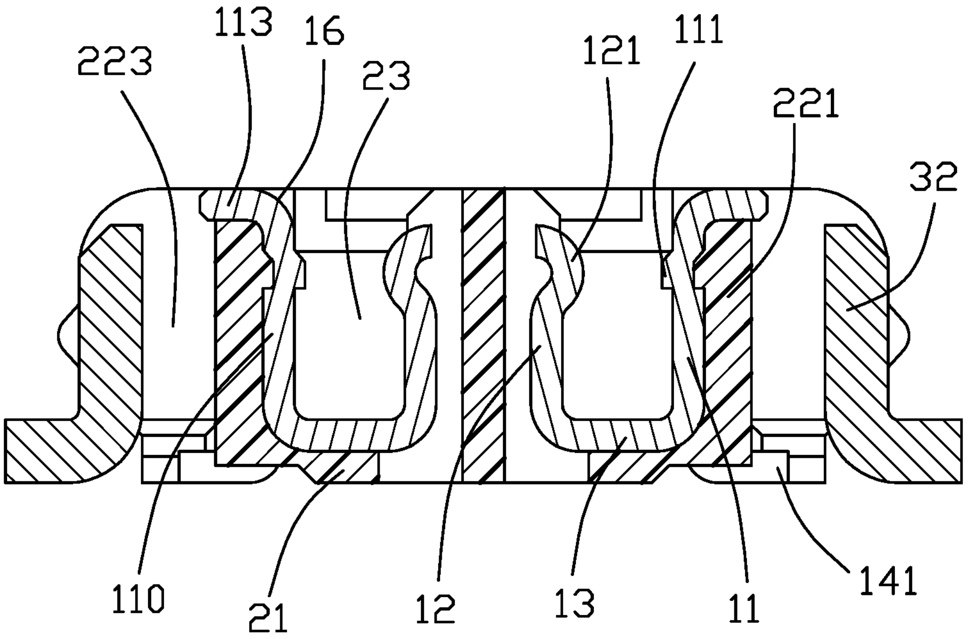
FIG. 9 is a cross-sectional view of the electrical connector taken along line A-A in FIG. 1.
Figure 10:
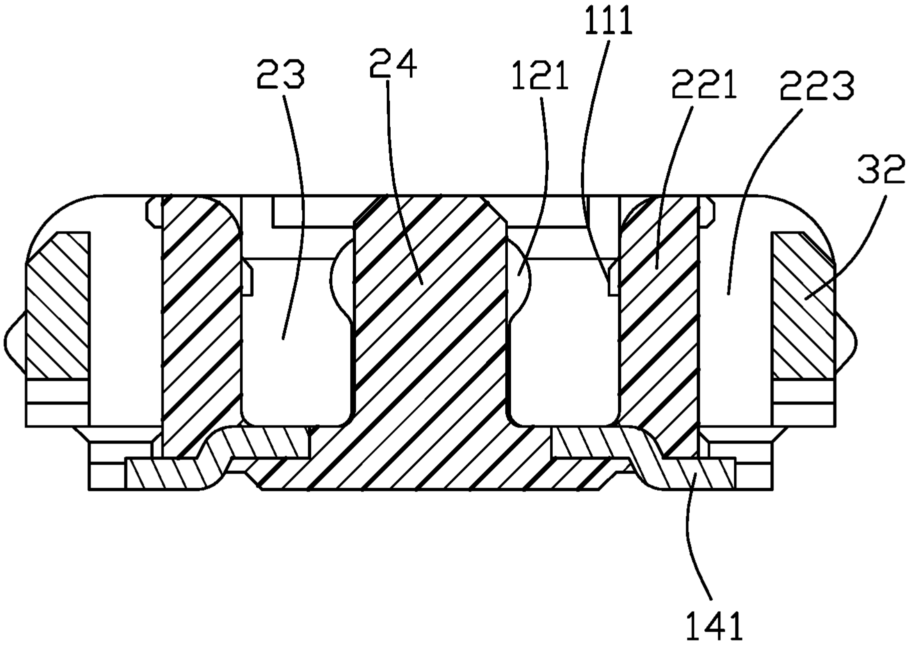
FIG. 10 is a cross-sectional view of the electrical connector taken along line B-B in FIG. 1.

In FIG. 8, the first and second arms 11 and 12 of the contact 1 in one row are aligned with those of the opposing contact 1 in the other row while associated soldering portions 14 are staggered, though not aligned and/or not staggered may be implemented in different applications.

The metallic shell 3 may be insert-molded with the insulative housing 2. The shell 3 includes a pair of side plates 32 at outer faces 2211 of the pair of side walls 221; the outer faces 2211 form recesses 223. From a top view, ends 141 of the soldering portions 14 extend to the recess 223 within the side plate 32. Each side plate 32 has a pair of upper abutting portions 321, at two outer sides of each row of contacts 1, configured in a way similar to the first arm 11 exposed at the inner face 2210 of the side wall 222.

Referring to FIGS. 11-16, the mating connector 200 has an insulative housing 4, two rows of contacts 5 secured to the insulative housing 4, and a metallic shell 6 that is insert-molded with the insulative housing 4 and has plural grounding legs 61. The insulative housing 4 has a base 41 and a peripheral wall 42 together defining a slot 43 for receiving the island 24 of the insulative housing 2. The peripheral wall 42 includes a pair of side walls 421 and a pair of end walls 422. The two rows of contacts 5 are insert-molded with pair of side walls 421, respectively. Each contact 5 includes an outer arm 51 exposed to an outer face of the side wall 421 and having a contacting portion 511, an inner arm 52 exposed to an inner face of the side wall 421 and having a contacting portion 521, and a soldering portion 53 extending outwardly from the inner arm 52. The metallic shell 6 has a peripheral wall 62 and a bottom wall 63. The bottom wall 63 has a pair of securing blades 631 insert-molded with the pair of end walls 422 of the insulative housing peripheral wall 42. The peripheral wall 62 surrounds and engages an outer faced of the metallic shell 3 when the electrical connector 100 and the mating connector 200 are mated. The securing blade 631 has a base 6311 and a pair of wings 6312. The wing 6312 has a protrusion 63121 extending outwardly of the end wall 422 for engaging the upper abutting portion 321 of the shell side plate 32. Specifically, the peripheral wall 62 has a pair of side plates 621 and a pair of end plates 622. The bottom wall 63 is connected to the pair of side plates 621. End of the soldering portion 53 of the contact 5 is situated inwardly of the side plate 621. The pair of securing blades 621 are located at two outer sides of each row of contacts 5. A pair of bottom openings 64 are defined between the metallic shell 6 and the insulative housing 4 for accommodating the soldering portions 53 of the contacts 5. The side plate 621 is provided with one or more inspection windows 6211.

What is claimed is:

1. An electrical connector comprising:

an insulative housing defining a channel; and a plurality of contacts secured to the insulative housing and arranged along a row direction, each contact having a first arm exposed to the channel, a second arm exposed to the channel, a bottom arm connected to the first and second arms, and a soldering portion connected to one of two opposite sides of the bottom arm along the row direction.

2. The electrical connector as claimed in claim 1, wherein the first arm is a stationary inner arm and the second arm is a flexible outer arm, and the soldering portion extends outwardly in a direction perpendicular to the row direction from the one side of the bottom arm.

3. The electrical connector as claimed in claim 1, wherein the plurality of contacts include two rows of contacts, the first and second arms of a contact in one row are aligned with those of an opposing contact in the other row while associated soldering portions thereof are staggered.

4. The electrical connector as claimed in claim 1, wherein a gap is formed in the row direction between the soldering portion and the bottom arm.

5. An electrical connector assembly comprising:

a first connector including:

an insulative housing defining a channel; and a plurality of first contacts secured to the insulative housing and arranged along a row direction, each contact having a first arm exposed to the channel, a second arm exposed to the channel, a bottom arm connected to the first and second arms, and a soldering portion connected to one of two opposite sides of the bottom arm along the row direction; and a second connector including:

an insulative housing; and a plurality of second contacts secured to the insulative housing and each adapted for contacting the first and second arms of a corresponding one of the plurality of first contacts.

6. The electrical connector assembly as claimed in claim 5, wherein the first arm is a stationary inner arm and the second arm is a flexible outer arm, and the soldering portion extends outwardly in a direction perpendicular to the row direction from the one side of the bottom arm.

7. The electrical connector assembly as claimed in claim 5, wherein the plurality of contacts include two rows of contacts, the first and second arms of a contact in one row are aligned with those of an opposing contact in the other row while associated soldering portions thereof are staggered.

8. The electrical connector assembly as claimed in claim 5, wherein a gap is formed in the row direction between the soldering portion and the bottom arm.

* * * * *